US011990112B2

(12) United States Patent
Trumpy et al.

(10) Patent No.: US 11,990,112 B2
(45) Date of Patent: May 21, 2024

(54) APPARATUS, SYSTEM AND/OR METHOD FOR ACOUSTIC ROAD NOISE PEAK FREQUENCY CANCELLATION

(71) Applicant: Harman International Industries, Incorporated, Stamford, CT (US)

(72) Inventors: David Trumpy, Novi, MI (US); Santosh Adari, Stamford, CT (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 17/971,377

(22) Filed: Oct. 21, 2022

(65) Prior Publication Data

US 2024/0135911 A1  Apr. 25, 2024

(51) Int. Cl.
*G10K 11/178* (2006.01)

(52) U.S. Cl.
CPC .. *G10K 11/17815* (2018.01); *G10K 11/17817* (2018.01); *G10K 11/17823* (2018.01); *G10K 11/17825* (2018.01); *G10K 11/17883* (2018.01); *G10K 2210/12821* (2013.01); *G10K 2210/3023* (2013.01); *G10K 2210/3026* (2013.01); *G10K 2210/3027* (2013.01); *G10K 2210/3028* (2013.01); *G10K 2210/3044* (2013.01); *G10K 2210/3055* (2013.01)

(58) Field of Classification Search
CPC ......... G10K 11/1781; G10K 11/17823; G10K 11/17879; G10K 11/17883; G10K 2210/12; G10K 2210/128; G10K 2210/12821; G10K 2210/3033
See application file for complete search history.

(56) References Cited

U.S. PATENT DOCUMENTS

| 11,198,337 B2 | 12/2021 | Bastyr et al. |
| 2009/0058633 A1 | 3/2009 | Luo et al. |
| 2019/0270350 A1* | 9/2019 | Bastyr ............... G10K 11/1781 |

FOREIGN PATENT DOCUMENTS

| EP | 3745393 A2 | 12/2020 |
| WO | 2009155696 A1 | 12/2009 |
| WO | 2022031279 A1 | 2/2022 |
| WO | 2022182351 A1 | 9/2022 |

OTHER PUBLICATIONS

Extended European Search Report dated Mar. 21, 2024 for European Patent Application No. 23202396.0, 11 pages.

* cited by examiner

*Primary Examiner* — Kile O Blair
(74) *Attorney, Agent, or Firm* — Brooks Kushman P.C.

(57) ABSTRACT

In at least one embodiment, an active noise cancellation (ANC) system is provided. The ANC system includes at least one loudspeaker, at least one microphone, and a reference generator. The at least one loudspeaker projects anti-noise sound within a cabin of a vehicle based at least on an estimated reference signal and an anti-noise signal. The at least one microphone to provide a first error signal indicative of noise and the anti-noise sound within the cabin. The at least one filter controller programmed to receive the first error signal and the estimated reference signal; and to control at least one adaptive filter to generate the anti-noise signal based at least on the first error signal and the estimated reference signal. The reference generator is programmed to generate the estimated reference signal based at least on one of vehicle speed, temperature of a tire of the vehicle, or tire pressure.

18 Claims, 6 Drawing Sheets

APPARATUS, SYSTEM AND/OR METHOD FOR ACOUSTIC ROAD NOISE PEAK FREQUENCY CANCELLATION

TECHNICAL FIELD

Aspects disclosed herein generally relate to an apparatus, system and/or method for performing acoustic road noise peak frequency cancellation. The disclosed apparatus, system(s) and/or method(s) may be used in connection with active noise cancellation (ANC) systems. These aspects and others will be discussed in more detail herein.

BACKGROUND

It is known to provide a method and apparatus for a low cost, acoustic tire cavity resonance cancellation. For example, such a system may include a sensor that infers a rotational speed of a vehicle. A frequency generator is configured to synthesize frequencies of a tire cavity resonance according to the rotational speed of the tire to generate a sense signal. An active noise control filter is configured to generate an anti-noise signal from the sense signal. A loudspeaker is configured to convert the anti-noise signal into anti-noise and to radiate the anti-noise to a listening position. The anti-noise signal is configured so that the anti-noise reduces sound of the tire cavity resonance at the listening position.

SUMMARY

In at least one embodiment, an active noise cancellation (ANC) system is provided. The ANC system includes at least one loudspeaker, at least one microphone, and a reference generator. The at least one loudspeaker projects anti-noise sound within a cabin of a vehicle based at least on an estimated reference signal and an anti-noise signal. The at least one microphone to provide a first error signal indicative of noise and the anti-noise sound within the cabin. The at least one filter controller programmed to receive the first error signal and the estimated reference signal; and to control at least one adaptive filter to generate the anti-noise signal based at least on the first error signal and the estimated reference signal. The reference generator is programmed to generate the estimated reference signal based at least on one of vehicle speed, temperature of a tire of the vehicle, or tire pressure.

In at least one embodiment, a method for performing active noise cancellation (ANC) is provided. The method includes transmitting anti-noise sound within a cabin of a vehicle based at least on an estimated reference signal and an anti-noise signal and providing a first error signal indicative of noise and the anti-noise sound within the cabin. The method includes receiving by at least one filter controller, the first error signal and the estimated reference signal and controlling at least one adaptive filter, via the at least one filter controller, to generate the anti-noise signal via the at least one filter controller based at least on the first error signal and the estimated reference signal. The method further includes generating the estimated reference signal based at least on one of vehicle speed, temperature of a tire of the vehicle, or tire pressure.

In at least one embodiment, a computer-program product embodied in a non-transitory computer readable medium that is programmed for performing active noise cancellation (ANC) is provided. The computer-program product includes instructions for transmitting anti-noise sound within a cabin of a vehicle based at least on an estimated reference signal and an anti-noise signal and providing a first error signal indicative of noise and the anti-noise sound within the cabin. The computer-program product includes instructions for receiving by at least one filter controller, the first error signal and the estimated reference signal and controlling at least one adaptive filter, via the at least one filter controller, to generate the anti-noise signal via the at least one filter controller based at least on the first error signal and the estimated reference signal. The computer-program product includes instructions for generating the estimated reference signal based at least on one of vehicle speed, temperature of a tire of the vehicle, or tire pressure.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
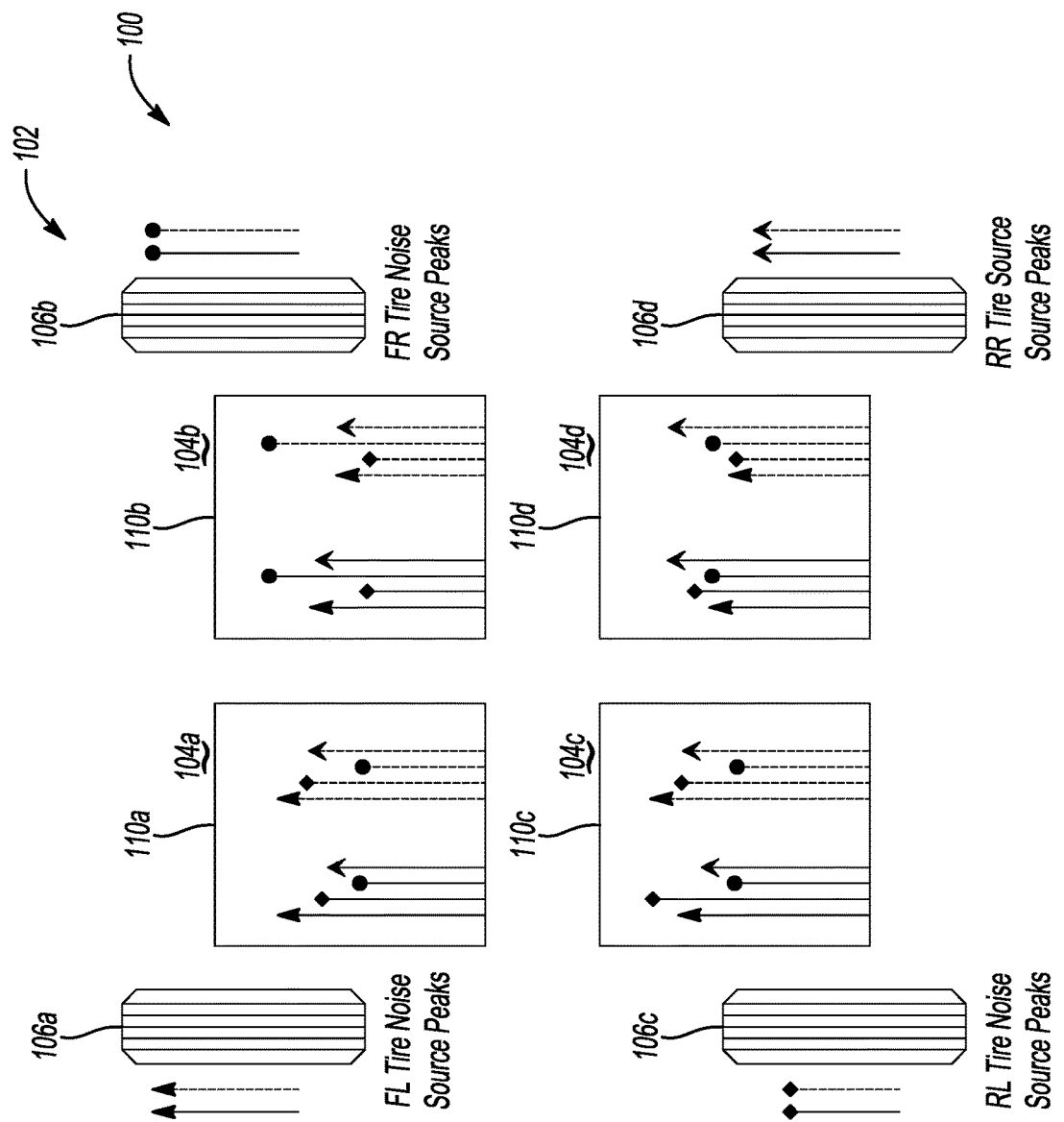
FIG. 1 depicts one example of a system in a vehicle exhibiting noise source peaks.

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Tire cavity noise is annoying to vehicle passengers. Active Noise Cancellation (ANC) techniques have been employed to reduce this noise in the vehicle cabin. However, this technology may be cost prohibitive for many customer applications. Several methods for cost reduced systems for cancelling tire cavity noise have been proposed. However, such systems may not address two problems: 1) tire cavity noise being comprised of a unique signature/frequency generated by each tire in the vehicle, and 2) a peak frequency may not be reliably determined a-priori.

Other prior art systems may provide other challenges. For example, a frequency of the tire cavity peak may not be reliably predicted based on vehicle speed. To cancel noise with an uncertain frequency, adaptive filter parameters (e.g., step size) may be set high to increase cancellation bandwidth. However, this may result in unacceptable out-of-band noise boosting. Out of band boosting may be eliminated by using a lower step size and a better reference for the noise signal frequency. One predictor of tire cavity frequency involves the utilization of an accelerometer signal. However, these concepts may not eliminate the need for an accelerometer.

Each tire produces a different tire cavity resonance frequency. Cancellation of one tire's resonance frequency in one quadrant of a vehicle may potentially create more noise in another quadrant of the vehicle. Typically, each seat location includes tire cavity noise contributions from the closest tire. However, anti-noise signals are generated simultaneously from all loudspeakers. Therefore, anti-noise may reach all seat locations. If the anti-noise frequency is different than the tire cavity peak frequency, both sounds will be present in that seat location. Therefore, it is not possible to simultaneously cancel tire cavity resonance peaks in all seat locations using a narrowband cancellation algorithm.

The disclosed ANC system enables, among other things, structure born noise with narrowband characteristics that may be cancelled without an accelerometer. The ANC system utilizes a stochastic noise model as a reference signal instead of an accelerometer. The ANC system utilizes a multiple output sub-band adaptive filter including multiple references and multiple feedback microphones to reduce tire cavity noise at multiple seat locations in the vehicle. The ANC system may be constantly updating as the environment changes (e.g., temperature, tire pressure, etc.) to handle the unpredictable characteristics of the noise.

The disclosed ANC system may be implemented for RNC applications. The ANC system provides a speaker output that is generated by filtering a reference signal with adaptive filter coefficients. The adaptive filter coefficients may be a frequency translated version of the filter coefficients created by the sub-band adaptive filter. The frequency translation may be performed by a frequency up-mixer.

The sub-band adaptive filter operates on signals that have been downmixed to a complex baseband representation of the signals. The sub-band adaptive filter updates via gradient descent minimization techniques employed in Least Mean Square (LMS) based adaptive filtering systems. The frequency up-mixer converts, a complex Inverse Fast Fourier Transform (IFFF) output to a real set of filter coefficients that are loaded into the adaptive filter. The disclosed up-mixer includes a sequence of a complex signal multiplier and up-sampling and filtering stages. The complex signal multiplies the filter coefficients by a reference frequency to shift the signal from the base-band frequency to a target noise cancellation frequency. The frequency down-mixer converts the real signals (e.g., the reference signal and microphone signals) into a complex base-band representation of those signals. This aspect may allow the adaptive filter to operate on a zoomed-in frequency range.

The disclosed ANC system also provides various solutions for generating reference signals without the use of accelerometers. In one example, noise may be shaped by a bandpass filter to have energy in the frequency range of interest for cancellation. This may avoid latency while adding filters to microphone or reference signals. The ANC system also provides, among other things, a reference noise model that may be generated via one or several methods for predicting signals such as an adaptive filter or neural network. The model may utilize vehicle operating conditions and produce a noise output with similar characteristics to tire cavity noise. The noise model may also take into account each tire independently or summed together. The noise model may be trained using vehicle recordings over multiple operating conditions.

The ANC system includes a sub-band adaptive filter topology that allows for, among other things, simultaneously solving for multiple frequencies at multiple error locations. The sub-band adaptive filter may not require an accelerometer signal to provide a high-coherence reference for in-cabin noise, thereby reducing cost of the system. These aspects and other will be discussed in more detail herein.

FIG. 1 depicts one example of a system 100 in a vehicle 102 exhibiting noise source signatures 110a-110d. The vehicle 102 includes various seat locations 104a-104d positioned thereabout. The seat location 104a may correspond to a driver positioned in a driver seat (e.g., front left seat), the seat location 104b may correspond to a passenger positioned in a front passenger seat (e.g., front left seat), the seat location 104c may correspond to a passenger positioned in a rear passenger seat (e.g., rear left seat), and the seat location 104d may correspond to a passenger positioned in a rear passenger seat (e.g., rear right seat). The vehicle 102 also includes plurality of wheels 106a-106d including tires and rims (not shown). The wheel 106a is generally positioned on the front left side of the vehicle 102, the wheel 106b is generally positioned on the front right side of the vehicle 102b, the wheel 106c is generally positioned on the rear left side of the vehicle 102, and the wheel 106d is generally positioned on the rear right side of the vehicle 102. Each of the wheels 106a-106d (or tires from the wheels 106a-106d) generate peaks in the noise signatures 110a-110d that are present at the seat locations 104a-104d, respectively, when engaged with a road surface. It is recognized that the frequency of the peaks in the noise signatures 110a-110d may change based on a number of factors, including but not limited to, vehicle speed, road surface, tire pressure, etc.

Each of the noise signatures 110a-110d includes a compilation (or sum) of the noise peaks at the corresponding seat locations 104a-104d, respectively. In general, each seat location 104a-104d experiences the different noise signatures 110a-110d attributed from the wheels 106a-106d. As shown, a superposition of waves may create multiples frequencies, or constructively or destructively interfere with one another.

Figure 2:
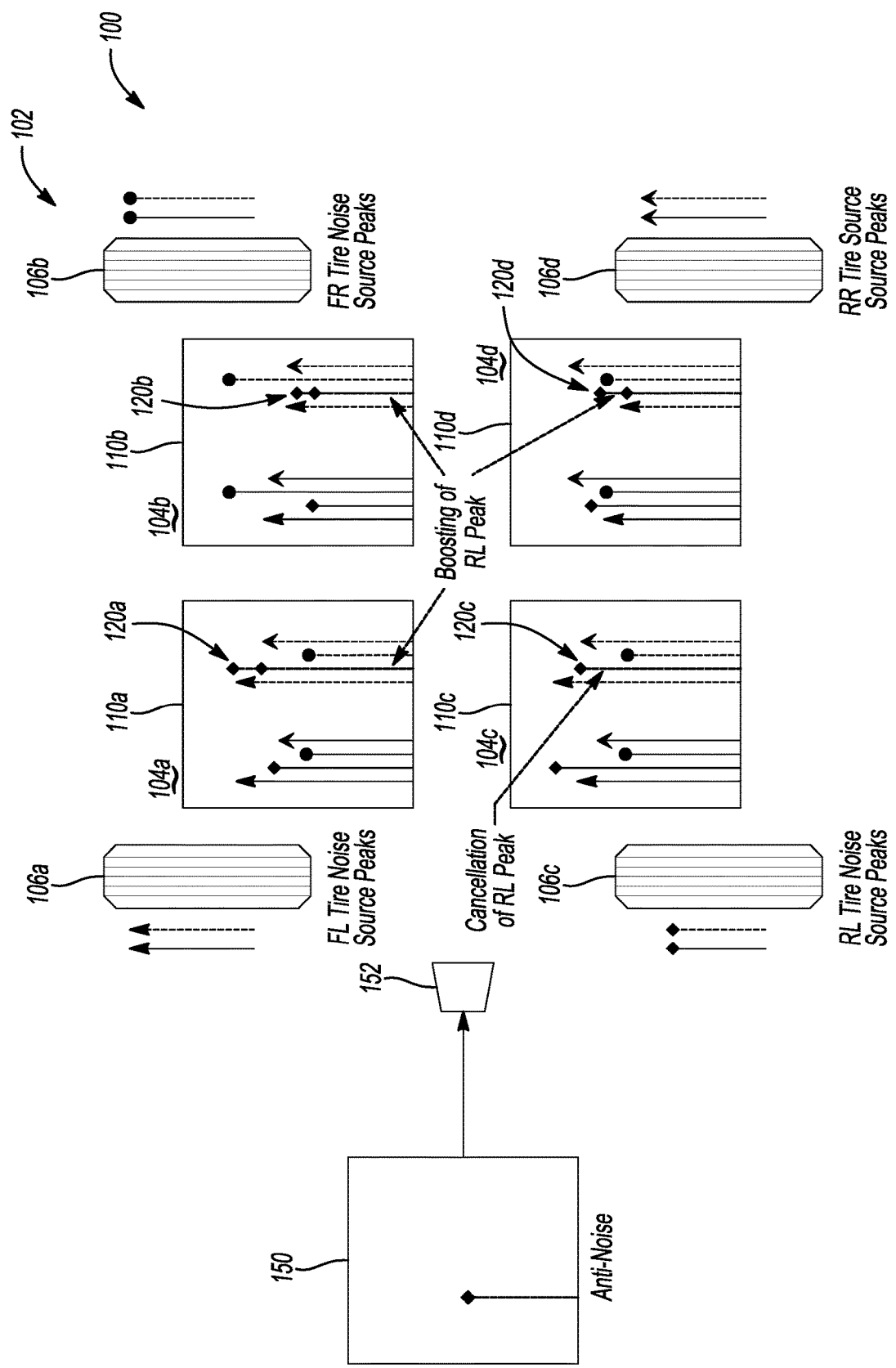
FIG. 2 depicts one example of an ANC system in a vehicle exhibiting noise source peaks.

FIG. 2 depicts another example of the ANC system 100 in the vehicle 102 exhibiting noise source peaks (or signatures 110a-110d). The system 100 includes an ANC controller 150 and at least one loudspeaker 152 (hereafter "the loudspeaker 152"). In general, the ANC controller 150 generates and transmits anti-noise signals via the loudspeaker 152 in the vehicle 102 and proximate to error microphones (not shown) positioned proximate to seat locations 104a-104d. FIG. 2 generally depicts an overall condition of boosting that may be attributed to the anti-noise signals. For example, the ANC controller 150 generates anti-noise signal to cancel noise generated by the wheel 106c. The anti-noise signal as generated by the ANC controller 140 cancels noise generated by the wheel 106a at the seat location 104c which causes increased noise (or boosting) (e.g., see points 120a, 120b, and 120c, and 120d) at the other seat locations 104a, 104b, and 104d. In general, each seat location 104a-104d experiences the different noise signatures 110a-110d attributed from the wheels 106a-106d which leads to the boosting as shown at points 120a, 120b, 120c, and 120d.

Figure 3:
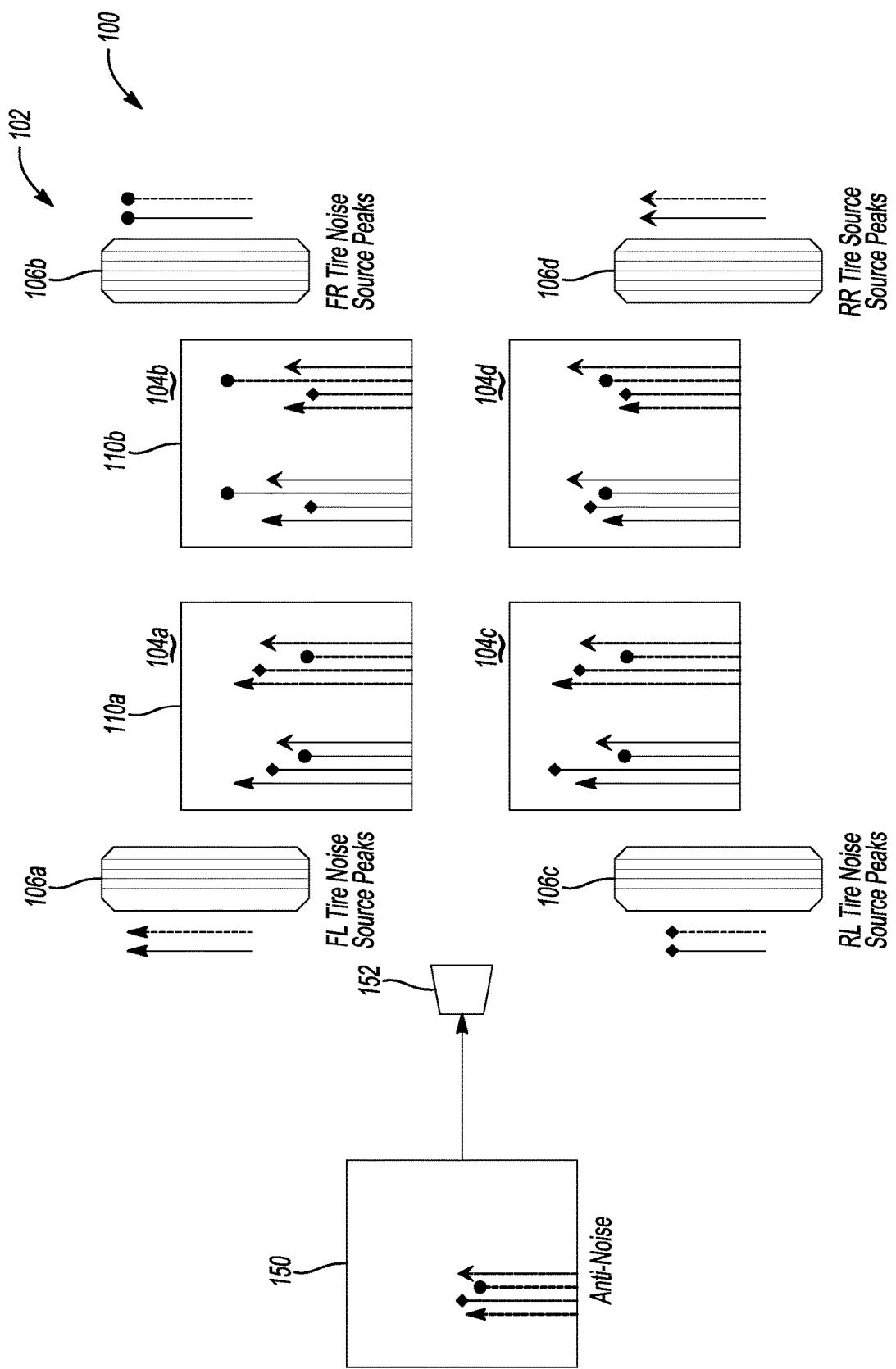
FIG. 3 depicts another example of an ANC system in a vehicle exhibiting noise source peaks.

FIG. 3 depicts another example of the ANC system 100 in the vehicle 102 exhibiting noise source signatures 110a-110d along with corresponding anti-noise signals to cancel the destructive noise. The disclosed system as set forth in hereafter may generate complex anti-noise signals that may correctly cancel the noise generated by the wheels 106a-106d without the utilization of accelerometer sensors to generate references signals that are used to generate the anti-noise signals.

Figure 4:
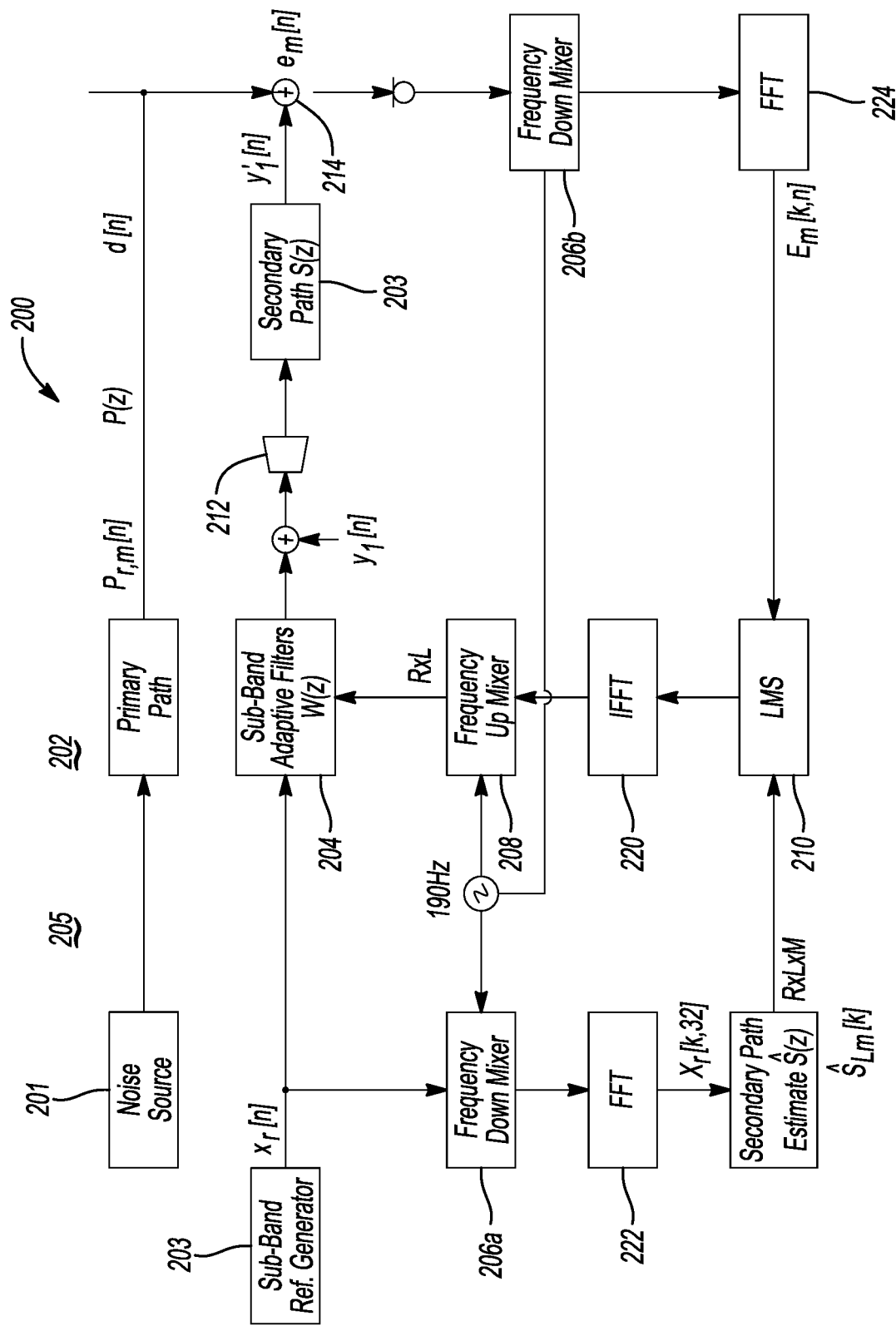
FIG. 4 depicts an ANC system in accordance with one embodiment.

FIG. 4 depicts a system 200 for performing ANC. In one example, the system 200 may perform acoustic road noise cancellation (RNC) for a vehicle 202. The system 200 generally includes a noise source 201, a sub-band reference generator 203, at least one adaptive filter 204 (hereafter "the adaptive filter 204"), a plurality of frequency down mixers 206a and 206b, a frequency up mixer 208, an adaptive filter controller 210, and at least one loudspeaker 212 (hereafter "the loudspeaker 212), and an error microphone 214. It is recognized that the system 200 includes a at least one controller 205 that is programmed to execute any one or more of the operations as set forth herein in connection with the system 200.

The noise source 201 provides primary noise signals (or a time dependent primary propagation paths in a frequency domain) $p_{r,m}[n]$ that are characterized by a primary path transfer function, P(z) (where r corresponds to individual reference signals, r=1 . . . R and m corresponds to individual error signals, m=1 . . . M). P(z) represents the transfer characteristics of a signal path between the noise source 201 and the error microphone 214. The adaptive filter 204 includes a transfer function, W(z) by which the adaptive filter controller 210 calculates a set of filter coefficients (or parameters) for the adaptive filter 204 and transfers the same via an Inverse Fast Fourier Transform (IFFT) block 220 and the frequency up mixer 208. The adaptive filter controller 210 may be implemented as a Least Mean Squared (LMS) based adaptive filter controller 210.

A secondary path that is characterized by a transfer function, S(z) is downstream of the adaptive filter 204. The secondary path may also correspond to so n [n], where/corresponds to secondary sources 1=1 . . . L. The sub-band reference generator 203 generates the reference signal, $x_r[n]$. The manner in which the sub-band reference generator 203 generates the reference signals, $x_r[n]$ will be discussed in more detail in connection with FIGS. 7 and 8. The sub-band reference generator 203 may not require accelerometers. The one or more reference signals may be represented by $x_r[n]$ which designate that such reference signals are in the time domain (e.g., Broadband $x_{r-bb}[n]$, Narrowband: $x_{r-nb}[n]$). The adaptive filter 204 receives one or more reference signals (or sub-band reference signals) that represent a disturbing noise signal, $d_n[n]$ generated by the noise source 201. The adaptive filter 204 convolves the reference signals with the latest computed filter coefficients provided by the adaptive filter controller 210 via the IFFT block 220 and the frequency up mixer 208. The adaptive filter 204 generates an anti-noise signal, $y_l[n]$ (or secondary source signal) which cancels the disturbing noise generated by the noise source 301. The loudspeaker 212 transmits the anti-noise signal, $y_l[n]$ into listening environment of the vehicle 202 to cancel the disturbing noise for the vehicle occupant. An estimated secondary path is generally defined by a transfer function $\hat{S}(z)$ of the actual secondary path transfer function S(z) and is also used by the adaptive filter controller 210 to calculate the filter coefficients of the transfer function, W(z) for the adaptive filter 204. The estimated secondary path may also be defined in the frequency domain as $\hat{S}_{l,m}[k]$ by an L×M matrix.

The error microphone 214 generates an error signal $e_m[n]$ in the time domain based on a filtered anti-noise signal $y'_l[n]$ and on the disturbing noise signal, $d_n[n]$. The frequency down mixer 206b converts a full bandwidth of the error signal $e_m[n]$ into a sub-band frequency range. The FFT block 224 generates the error signal, $E_m[k,n]$ which is in the frequency domain. This aspect will be discussed in more detail below. The adaptive filter controller 210 may utilize the error signals in a frequency domain (e.g., $E_m[k,n]$) along with the estimated secondary path $\hat{S}_{l,m}[k]$ to determine the filter coefficients of the transfer function, W(z). The estimated secondary path got [k] filters the reference signal $x_r[n]$ to create a unique reference signal for each adaptive filter 204. The estimated secondary path $\hat{S}_{l,m}[k]$ is a filter that represents an estimate of S(z). The estimated secondary path $\hat{S}_{l,m}[k]$ is generally set during the tuning of the ANC algorithm and S(z) represents the secondary path in the vehicle 202 which may change. While FIG. 4 illustrates a single adaptive filter 204, it is recognized that there may be any number of adaptive filters 204 in addition to the other components illustrated in FIG. 4 implemented in the system 200. In general, the frequency domain reference $X_r[n]$ may be multiplied by the frequency domain secondary path estimate $\hat{S}_{l,m}[k]$ to produce a reference signal for each sub-band adaptive filter adaptation in the adaptive filter controller (or LMS block) 210. This process generally expands R reference signals into a R×L×M.

The frequency down mixer 206a generates an estimated reference signal $X_r[n]$ in the time domain. This operation will be discussed in more detail below. An FFT block 222 converts the time-based domain of the estimated reference signal $x_r[n]$ into an estimated reference signal in a frequency domain, $X_r[k, n]$. The adaptive filter controller 210 may utilize the error signals in a frequency domain (e.g., $E_m[k,n]$) along with the estimated reference signal $X_r[k, n]$ in the frequency domain to determine the filter coefficients of the transfer function, W(z). For example, the adaptive filter controller 210 may employ an LMS gradient decent for determining the filter coefficients for the coefficients for the adaptive filter 204. In general, the frequency down mixers 206a, 206b and the frequency up mixer 208 converts the adaptive filter 204 into a sub-band adaptive filter which focuses on a frequency of interest. While the adaptive filter controller 210 is generally shown as an LMS based controller, it is recognized that the adaptive filter controller 210 may be implemented as n-LMS, Recursive Least Squares, etc.).

Figure 5:
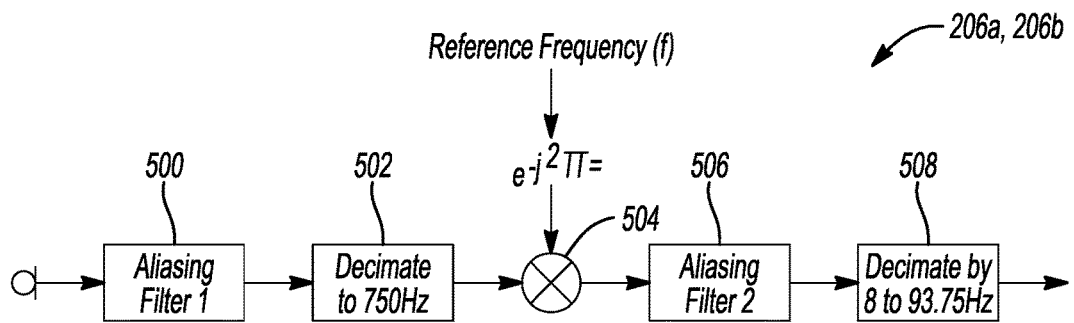
FIG. 5 depicts an example of a frequency down mixer of the ANC system of FIG. 4 in accordance with one embodiment.

FIG. 5 depicts an example of the frequency down mixer 206a or 206b of the ANC system 200 of FIG. 4 in accordance with one embodiment. The frequency down mixer 206a or 206b is generally configured to convert a full bandwidth signal of the estimated reference signal $x_r[n]$ or the error signal, $e_m[n]$ into a sub-band frequency range.

The frequency down mixer 206a or 206b includes a first aliasing filter 500, a first decimator 502, a multiplier circuit 504, a second aliasing filter 506, and a second decimator 508. The first aliasing filter 500 attenuates the incoming signal in the time domain (e.g., estimated reference signal $x_r[n]$ or the error signal, $e_m[n]$) above, for example, 300 Hz. The first decimator 502 decimates the output from the first aliasing filter 500 into, for example, 750 samples per second. The first decimator 502 lowers a sampling rate of the output of the first aliasing filter 500 for more efficient processing. The multiplier circuit 504 receives the output from the first decimator 502 and a reference frequency, f that provides a complex exponential signal that is created from the reference frequency, f. The multiplier circuit 504 shifts the reference frequency, f to 0 Hz. The second aliasing filter 506 removes frequencies from the reference frequency that are outside a range from, for example, a reference frequency of −40 Hz to +40 Hz. The second decimator 508 decimates the output provided by the second aliasing filter 506 from, for example, 8 to 93.75 Hz which increases a frequency resolution to achieve a high-resolution frequency analysis. The frequency down mixer 206a or 206b then provides a final output that is a narrow-band time domain-based signal.

Figure 6:
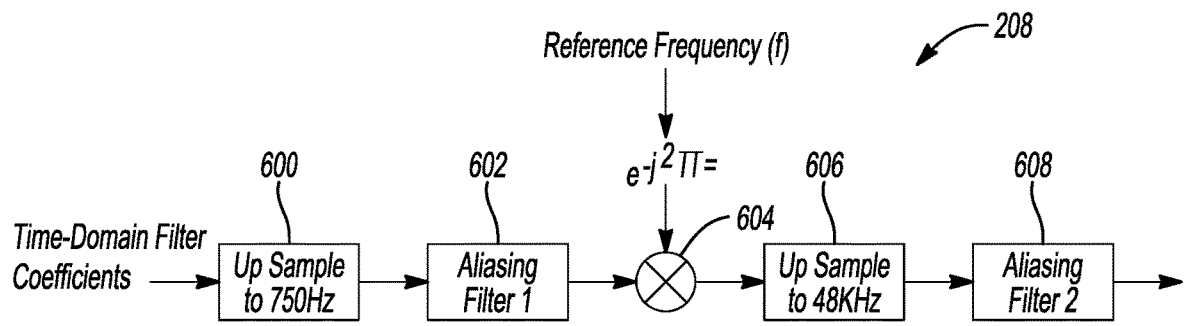
FIG. 6 depicts an example of a frequency up mixer of the ANC system of FIG. 4 in accordance with one embodiment.

FIG. 6 depicts an example of the frequency up mixer 208 of the ANC system 200 of FIG. 4 in accordance with one embodiment. The frequency up mixer 208 is generally configured to provide the filter coefficients to the adaptive filter 204 and provide interpolation and mixing stages to convert the baseband filter coefficients to the frequency range of the physical system. The frequency up mixer 208 includes a first up sample circuit 600, a first aliasing filter 602, a multiplier circuit 604, a second up sample circuit 606, and a second aliasing filter 608. The first up sample circuit 600 up samples the frequency, for example, to 750 Hz. This aspect increases the sampling rate prior to the frequency mixing occurring. The first aliasing filter 602 removes images from the output of the first up sample circuit 600 created by the up-sampling process (or by the first up sample circuit 600).

The multiplier circuit 604 performs complex multiplication with a complex exponential signal that is generated by a reference frequency, f. This aspect shifts the filter coefficients generated by the adaptive filter controller 210 from, for example, 0 Hz back to the reference frequency, f. The second up sample circuit 606 up-samples the output of the multiplier circuit 604 to, for example, 48 KHz. This aspect converts the filter coefficients back to the system sampling rate. The second anti-aliasing filter 608 removes images created during the up-sampling process (e.g., by the second up-sample circuit 606). The frequency up-mixer 208 provides filter coefficients of the adaptive filter 204 in the time domain at the system sampling rate.

Figure 7:
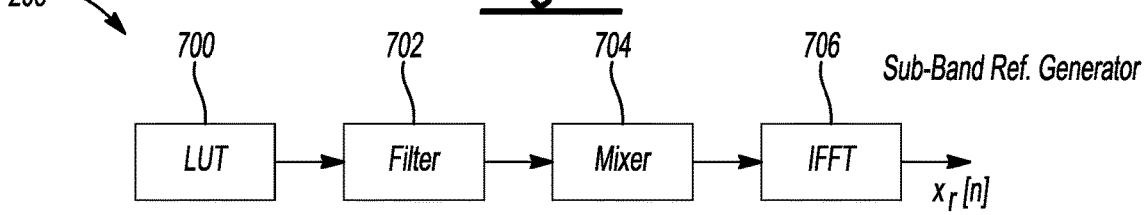
FIG. 7 depicts one example of a sub-band reference generator that generates reference signals in accordance with one embodiment.

FIG. 7 depicts one example of the sub-band reference generator 203 of FIG. 2 that generates reference signals in accordance with one embodiment. The sub-band reference generator 203 includes a look up table (LUT) 700, a filter 702, a mixer 704, and an IFFT block 706. The LUT 700 may store data corresponding to vehicle speed, temperature and/or tire pressure information to determine an appropriate frequency range to provide as a reference signal. The LUT 700 stores and provides a corresponding frequency value based on the tire pressure, temperature of the tire, and/or vehicle speed. Thus, the controller 205 (see FIG. 2) may receive information related to the vehicle speed, the temperature, and/or the tire pressure information over a data communication bus in the vehicle 202. In one example, the data communication bus may be implemented as a Controller Area Network (CAN) data bus. In general, a vehicle speed sensor (or a wheel speed sensor) and an accelerometer measure different aspects. The wheel speed sensor measures a speed at which a tire or wheel. On the other hand, the accelerometer measures vibration due to tire cavity noise. A vehicle speed sensor can be used generally to predict a noise range that the peak noise will be in, and the sub-band reference generator 203 may provide a time-domain signal corresponding to that predicted noise range that the peak noise may be present in. The accelerometers provide a real-time vibration signal that is a time-domain signal of the actual tire peak noise. With one or more of the embodiments disclosed herein, it is possible to reuse the existing vehicle speed sensor (or the wheel speed sensor) while eliminating the accelerometer which are traditionally known as being expensive.

The controller 205 selects the corresponding frequency from the LUT 700 based on any one or more of the input variables (e.g., vehicle speed, temperature of tire, and/or tire pressure information from one or more wheels). The controller 205 may receive a corresponding vehicle speed input and/or tire pressure reading from each corresponding wheel in the vehicle 202. For example, a corresponding wheel speed sensor or tachometer may be positioned proximate to each wheel to provide the speed of the wheel as the vehicle 202 travels. Similarly, a corresponding tire pressure sensor may be positioned on a wheel/tire and provide a tire pressure reading and/or temperature for the corresponding tire. Thus, in this regard, the LUT 700 provides a corresponding frequency for each tire/wheel of the vehicle 202. The frequency for each tire/wheel may be indicative of road noise that requires cancellation. An example of the noise present at each of the wheel/tires is generally shown in FIGS. 1-3 for reference.

Figure 8:
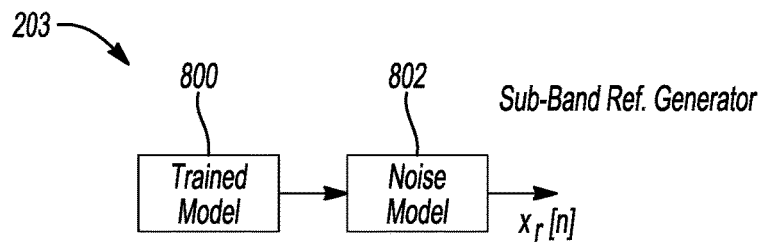
FIG. 8 depicts another example of a sub-band reference generator that generates reference signals in accordance with one embodiment.

The filter 702 filters the corresponding frequency signal. The mixer 704 sums all of the frequencies (e.g., four frequencies assuming the vehicle 202 has four tires/wheels) to form a single reference signal. In one example, the noise source signatures 110a-110c as shown in connection with FIGS. 1-3 may correspond to a summed single reference signal. The IFFT block 706 generates a time domain-based reference signal that includes the sum of frequency sinusoids to provide the reference signal $x_r[n]$. In another embodiment, the controller 205 as shown in FIG. 4 may load frequency domain information (e.g., magnitude and phase of frequency of interest based on the vehicle speed, temperature of tire, and/or tire pressure information from one or more wheels) into the IFFT block 220 to convert the frequency domain information into the time domain FIG. 8 depicts another example of the sub-band reference generator 203 of FIG. 2 that generates reference signals in accordance with one embodiment. The sub-band reference generator 203 includes a trained model 800 and a noise model 802. The trained model 800 creates the noise signal (or reference signal) based on environment models. Environmental models may be filter banks that are tuned based on data recorded from a target vehicle or from a historical set of data from multiple vehicles. The system 200 may adjust the model based on environmental parameters such as wheel speed, tire pressure, tire temperature, etc. A successfully trained model represents a spectral envelope of the frequency range of interest based on the environmental parameters. The filters could be implemented based on Linear Predictive Coding (LPC) modeling of the peak noise in conjunction with models that relate a spectral envelope with the environmental parameters. White noise is then played through these filters to generate a time-domain reference signal.

Figure 9A:
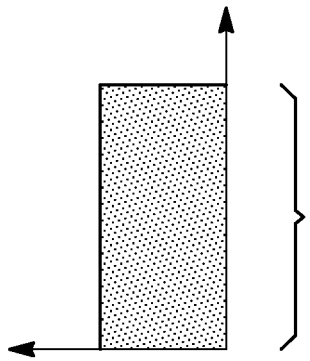
FIGS. 9A-9C depict plots of comparisons of road noise cancellation (RNC) and engine order cancellation (EOC) features.
Figure 9B:
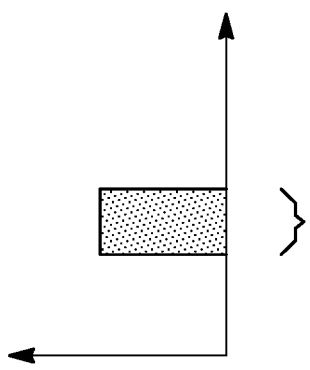
Figure 9C:
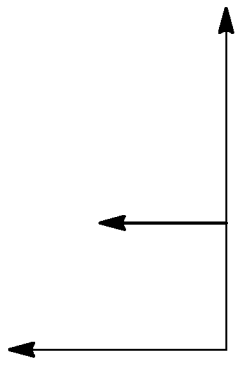

FIGS. 9A-9B depict plots of comparisons of road noise cancellation (RNC) and engine order cancellation (EOC) features. FIG. 9A generally depicts the condition in which a traditional road noise cancellation (RNC) system exhibits a low resolution from 0 to 300 Hz. FIG. 9B generally depicts the condition in which the disclosed system 200 improves resolution in a narrow range. FIG. 9C depicts the condition in which a narrowband cancellation algorithm handles a single frequency. In reference to FIG. 9B, one anti-noise sinusoid signal produced by a single source may not cancel multiple frequencies produced by multiple tires at multiple seat locations. The frequency spacing of multiple noise peaks may be narrower than one FFT bin from a low resolution RNC system. A RNC system may have a FFT resolution of 128 bins spanning over 300 Hz which provides a 2.3 Hz resolution for the adaptive filter and anti-noise generation. The adaptive filter may not be able to converge to a magnitude and phase for multiple frequencies closer than this resolution. Using the zoom approach, spanning 93.75 Hz will achieve a 0.7 Hz resolution.

It is recognized that the controllers as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controllers as disclosed utilizes one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware-based inputs and outputs for receiving and transmitting data, respectively from and to other hardware-based devices as discussed herein.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. An active noise cancellation (ANC) system comprising:
   at least one loudspeaker to project anti-noise sound within a cabin of a vehicle based at least on an estimated reference signal and an anti-noise signal;
   at least one microphone to provide a first error signal indicative of noise and the anti-noise sound within the cabin; and
   at least one filter controller programmed to:
      receive the first error signal and the estimated reference signal; and
      control at least one adaptive filter to generate the anti-noise signal based at least on the first error signal and the estimated reference signal;
   a reference generator programmed to generate the estimated reference signal based at least on one of vehicle speed, temperature of a tire of the vehicle, or tire pressure; and
   a frequency downmixer programmed to convert a full bandwidth signal of one of the estimated reference signal and the first error signal into a sub-band frequency range prior to the at least one filter controller controlling the at least one adaptive filter to generate the anti-noise signal based at least on the first error signal and the estimated reference signal.

2. The ANC system of claim 1, wherein the reference generator is further programmed to generate the estimated reference signal having a frequency range of interest based at least on one of the vehicle speed, the temperature of the tire of the vehicle, or the tire pressure.

3. The ANC system of claim 1, wherein the reference generator is further programmed to generate the estimated reference signal independent of information from an accelerometer.

4. The ANC system of claim 1 further comprising memory including a look up table (LUT) to store a frequency value to provide the estimated reference signal to the at least one filter controller based on at least one of the vehicle speed, the temperature of the tire of the vehicle, or the tire pressure.

5. The ANC system of claim 4, wherein the LUT stores the frequency value based on the at least one of the vehicle speed, the temperature of the tire of the vehicle, or the tire pressure for each tire in the vehicle.

6. The ANC system of claim 5, wherein the reference generator includes a mixer to sum each frequency value for each tire in the vehicle to provide the estimated reference signal as a single estimated reference signal.

7. The ANC system of claim 1, wherein the reference generator includes a trained model that provides a spectral envelope of a frequency range of interest for the estimated reference signal based on environmental parameters.

8. The ANC system of claim 7, wherein the environmental parameters correspond to the at least one of the vehicle speed, the temperature of a tire of the vehicle, or the tire pressure.

9. The ANC system of claim 7, wherein the trained model represents a historical set of data for the vehicle speed, the temperature of the tire, and the tire pressure and corresponding frequency value.

10. The ANC system of claim 1, wherein the frequency downmixer includes:
    a first aliasing filter programmed to attenuate one of the estimated reference signal and the first error signal to provide a first output;
    a first decimator programmed to lower a sampling rate of the first output to provide a second output;
    a multiplier circuit programmed to receive a reference frequency and the second output to provide a complex exponential signal;
    a second aliasing filter programmed to provide to remove frequencies from the reference frequency that are outside of a predetermined frequency range; and
    a second decimator programmed to provide a decimate a third output from the second aliasing filter to increase a frequency resolution of the one of the estimated reference signal and the first error signal.

11. A method for performing active noise cancellation (ANC), the method comprising:
    transmitting anti-noise sound within a cabin of a vehicle based at least on an estimated reference signal and an anti-noise signal;
    providing a first error signal indicative of noise and the anti-noise sound within the cabin;
    receiving by at least one filter controller, the first error signal and the estimated reference signal;
    controlling at least one adaptive filter, via the at least one filter controller, to generate the anti-noise signal via the at least one filter controller based at least on the first error signal and the estimated reference signal;

generating the estimated reference signal based at least on one of vehicle speed, temperature of a tire of the vehicle, or tire pressure;

storing a frequency value to provide the estimated reference signal in a lookup table (LUT) to provide the estimated reference signal to the at least one filter controller based at least on one of the vehicle speed, the temperature of the tire of the vehicle, or the tire pressure;

storing the frequency value in the LUT based on the at least one of the vehicle speed, the temperature of the tire of the vehicle, or the tire pressure for each tire in the vehicle; and summing each frequency value for each tire in the vehicle with a mixer to provide the estimated reference signal as a single estimated reference signal.

12. The method of claim 11, wherein generating the estimated reference signal further includes generating the estimated reference signal having a frequency range of interest based at least on one of the vehicle speed, the temperature of the tire of the vehicle, or the tire pressure.

13. The method of claim 11, wherein generating the estimated reference signal further includes generating the estimated reference signal independent of information from an accelerometer.

14. An active noise cancellation (ANC) system comprising:

at least one loudspeaker to project anti-noise sound within a cabin of a vehicle based at least on an estimated reference signal and an anti-noise signal;

at least one microphone to provide a first error signal indicative of noise and the anti-noise sound within the cabin; and at least one filter controller programmed to:
receive the first error signal and the estimated reference signal; and
control at least one adaptive filter to generate the anti-noise signal based at least on the first error signal and the estimated reference signal; and a reference generator programmed to generate the estimated reference signal based at least on one of vehicle speed, temperature of a tire of the vehicle, or tire pressure;

wherein the reference generator includes a trained model that provides a spectral envelope of a frequency range of interest for the estimated reference signal based on environmental parameters; and wherein the trained model represents a historical set of data for the vehicle speed, the temperature of the tire, and the tire pressure and corresponding frequency value.

15. The ANC system of claim 14 further comprising a frequency downmixer programmed to convert a full bandwidth signal of one of the estimated reference signal and the error signal into a sub-band frequency range prior to the at least one filter controller controlling the at least one adaptive filter to generate the anti-noise signal based at least on the first error signal and the estimated reference signal.

16. The ANC system of claim 14 further comprising memory including a look up table (LUT) to store a frequency value to provide the estimated reference signal to the at least one filter controller based on at least one of the vehicle speed, the temperature of the tire of the vehicle, or the tire pressure.

17. The ANC system of claim 16, wherein the LUT stores the frequency value based on the at least one of the vehicle speed, the temperature of the tire of the vehicle, or the tire pressure for each tire in the vehicle.

18. The ANC system of claim 17, wherein the reference generator includes a mixer to sum each frequency value for each tire in the vehicle to provide the estimated reference signal as a single estimated reference signal.

* * * * *